United States Patent
Martakov et al.

(10) Patent No.: US 10,324,432 B2
(45) Date of Patent: Jun. 18, 2019

(54) ESTIMATION OF ELECTROMAGNETIC TOOL SENSITIVITY RANGE

(71) Applicants: Sergey Martakov, The Woodlands, TX (US); Mikhail Vladimirovich Sviridov, Novosibirsk (RU)

(72) Inventors: Sergey Martakov, The Woodlands, TX (US); Mikhail Vladimirovich Sviridov, Novosibirsk (RU)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 367 days.

(21) Appl. No.: 15/134,971

(22) Filed: Apr. 21, 2016

(65) Prior Publication Data

US 2017/0306741 A1    Oct. 26, 2017

(51) Int. Cl.
| | |
|---|---|
| *G01V 3/34* | (2006.01) |
| *G05B 17/02* | (2006.01) |
| *G01V 3/30* | (2006.01) |
| *G01V 3/26* | (2006.01) |

(Continued)

(52) U.S. Cl.
CPC .............. *G05B 17/02* (2013.01); *G01V 3/30* (2013.01); *E21B 7/04* (2013.01); *G01V 3/12* (2013.01); *G01V 3/26* (2013.01); *G01V 3/34* (2013.01)

(58) Field of Classification Search
CPC . G05B 17/02; G01V 3/10; G01V 3/12; G01V 3/24; G01V 3/34; E21B 7/04
See application file for complete search history.

(56) References Cited

U.S. PATENT DOCUMENTS

| | | | |
|---|---|---|---|
| 5,675,147 A | 10/1997 | Ekstrom et al. | |
| 5,999,883 A | 12/1999 | Gupta et al. | |
| 6,741,185 B2 | 5/2004 | Shi et al. | |

(Continued)

FOREIGN PATENT DOCUMENTS

| | | |
|---|---|---|
| WO | 0050926 A1 | 8/2000 |
| WO | 2016025232 A1 | 2/2016 |

OTHER PUBLICATIONS

Geosciences and Engineering, vol. 4, No. 6 (2015), pp. 9-21. (Year: 2015).*

(Continued)

*Primary Examiner* — Jarrett J Stark
(74) *Attorney, Agent, or Firm* — Cantor Colburn LLP

(57) ABSTRACT

A system and method to control drilling based on determining a sensitivity range of an electromagnetic tool include obtaining a resistivity model over an interval of depths, obtaining an original tool response from the resistivity model over the interval of depths for a tool configuration, and positioning an artificial layer in the resistivity model to generate a modified resistivity model. The method also includes obtaining a modified tool response from the modified resistivity model and iteratively performing the positioning the artificial layer and the obtaining the modified tool response, estimating the sensitivity range according to a position of the artificial layer when a normalized difference between the original tool response and the modified tool response reaches a threshold value, and assigning a different confidence level to information obtained from the resistivity model beyond the sensitivity range and controlling the drilling based on the resistivity model and the confidence level.

15 Claims, 5 Drawing Sheets

(51) Int. Cl.
*G01V 3/12* (2006.01)
*E21B 7/04* (2006.01)

(56) References Cited

U.S. PATENT DOCUMENTS

| | | | |
|---|---|---|---|
| 6,801,136 B1 | 10/2004 | Goodman et al. | |
| 7,268,556 B2 | 9/2007 | Fanini et al. | |
| 7,609,169 B2 | 10/2009 | Aiello | |
| 7,719,282 B2 | 5/2010 | Fanini et al. | |
| 7,822,562 B2 | 10/2010 | Dennis | |
| 8,305,081 B2 | 11/2012 | Reiderman et al. | |
| 8,364,404 B2 | 1/2013 | Legendre et al. | |
| 8,380,438 B2 | 2/2013 | Jarrot et al. | |
| 8,433,518 B2 | 4/2013 | Omeragic et al. | |
| 8,860,582 B2 | 10/2014 | Clark | |
| 2003/0093223 A1 | 5/2003 | Zhang et al. | |
| 2005/0212520 A1* | 9/2005 | Homan | G01V 3/30 324/338 |
| 2010/0018719 A1* | 1/2010 | Lu | G01V 3/12 166/369 |
| 2010/0039114 A1 | 2/2010 | Hornbostel et al. | |
| 2010/0271030 A1 | 10/2010 | Reiderman et al. | |
| 2011/0063949 A1 | 3/2011 | Itskovich | |
| 2012/0059586 A1 | 3/2012 | Itskovich et al. | |
| 2013/0226461 A1 | 8/2013 | Yu et al. | |
| 2014/0107929 A1 | 4/2014 | Zhong et al. | |
| 2014/0368201 A1 | 12/2014 | Leblanc et al. | |
| 2015/0035536 A1* | 2/2015 | Tang | G01V 3/20 324/339 |
| 2017/0269255 A1* | 9/2017 | Wilson | G01V 3/38 |

OTHER PUBLICATIONS

Colombo et al., "Feasibility study of surface-to-borehole CSEM for oil-water fluid substitution in Ghawar field", GEO poster, 2010, pp. 1-4.

Hartmann et al., "Verification Testing of a New Extra-Deep Azimuthal Resistivity Measurement", SPWLA 55th Annual Logging Symposium, May 18-22, 2014, pp. 1-12.

Rabinovich et al., "The Vagaries and Myths of Look-Around Deep-Resistivity Measurements While Drilling", Petrophysics, vol. 53, No. 2, Apr. 2012, pp. 1-16.

Sviridov et al., "New Software for Processing of LWD Extradeep Resistivity and Azimuthal Resistivity Data", SPE Reservoir Evaluation & Egineering, 2014, pp. 1-19.

International Search Report and Written Opinion for PCT Application No. PCT/US2017/028763, dated Jul. 27, 2017, pp. 1-9.

* cited by examiner

ESTIMATION OF ELECTROMAGNETIC TOOL SENSITIVITY RANGE

BACKGROUND

In energy exploration and production efforts, physical conditions are monitored to facilitate accurate decision-making. For example, resistivity or conductivity of the formation around a subsurface borehole indicates the type of formation. Resistivity may be obtained using an induction tool or another electromagnetic (EM) tool. Generally, the induction tool transmits a magnetic field into the formation and measures a magnetic field induced by the eddy currents in the formation. The measured magnetic field is used to determine apparent resistivity values and/or azimuthal signals. Through an inversion process, a resistivity model is obtained from these determined values. This resistivity model indicates layers of different resistivity values and the depths of boundaries between the layers. Once the resistivity model is developed, information akin to the measured values of the electromagnetic tool, generally referred to as tool response, may be obtained.

SUMMARY

According to embodiments, a method of controlling drilling based on determining a sensitivity range of an electromagnetic tool includes obtaining a resistivity model over an interval of depths; obtaining an original tool response from the resistivity model over the interval of depths for a tool configuration; positioning an artificial layer in the resistivity model to generate a modified resistivity model; obtaining a modified tool response from the modified resistivity model; iteratively performing the positioning the artificial layer and the obtaining the modified tool response; estimating the sensitivity range according to a position of the artificial layer when a normalized difference between the original tool response and the modified tool response reaches a threshold value; and assigning a different confidence level to information obtained from the resistivity model beyond the sensitivity range and controlling the drilling based on the resistivity model and the confidence level.

According to another embodiment, a system to control drilling by determining a sensitivity range of an electromagnetic tool include a memory device configured to store a resistivity value of an artificial layer corresponding with scenarios; and a processor configured to obtain a resistivity model over an interval of depths, obtain an original tool response from the resistivity model over the interval of depths for a tool configuration, position an artificial layer in the resistivity model to generate a modified resistivity model, obtain a modified tool response from the modified resistivity model, iteratively perform positioning of the artificial layer and obtaining the modified tool response, estimate the sensitivity range according to a position of the artificial layer when a normalized difference between the original tool response and the modified tool response reaches a threshold value, assign a different confidence level to information obtained from the resistivity model beyond the sensitivity range, and control the drilling based on the resistivity model and the confidence level.

BRIEF DESCRIPTION OF THE DRAWINGS

Referring now to the drawings wherein like elements are numbered alike in the several Figures.

DETAILED DESCRIPTION

As noted above, information about downhole conditions and formation properties is used in drilling and production efforts. Among those properties is formation resistivity, which may be obtained using an induction tool. Apparent resistivity values or/and azimuthal signals are determined from the tool measurements. A resistivity model may then be developed through an inversion process performed on the determined values, and tool response (e.g., amplitude and phase signals, attenuation, phase shift, azimuthal signals) may be obtained from the resistivity model. The resistivity model constructed through inversion is associated with some uncertainty based on noise in the data and on tool sensitivity to the parameters of the model. The tool response refers to a number of variables and is obtained with known algorithms from the resistivity model. Based on the particular known algorithms that are used, a different set of variables may make up the matrix of values referred to as tool response. Generally, these well-known algorithms are functions developed by mathematical modeling or empirical measurements. The functions represent known relationships between resistivity (and borehole position) and variables of interest such as, for example, that attenuation increases as conductivity increases. The particular algorithms used to obtain tool response are not central to the embodiments herein. The relevance of tool response to the embodiments of the invention is that the same algorithm(s) is used to obtain tool response from an original resistivity model and from a modified resistivity model. The difference between the tool responses resulting from each of the resistivity models is the basis for determining tool sensitivity range, as detailed below. Exemplary variables that make up a matrix of tool responses include amplitude and phase signals, attenuation, phase shift, and azimuthal signals. The tool response varies according to frequency and spacing between the transmitter and receiver of the tool.

Embodiments of the systems and methods detailed herein relate to estimating the sensitivity range of the electromagnetic tool. Estimation of tool sensitivity range facilitates a determination of the ranges (part of the resistivity model) for which tool response may be determined and the level of confidence of the determination. The tool sensitivity may be indicated to a user, for example, so that the user understands the level of confidence associated with different ranges shown on the model. The tool sensitivity information may also be used in subsequent inversions to improve the result. Exemplary applications of resistivity information, which includes the geometric characteristics of resistivity distribution, obtained with the tool include geosteering, mapping of the reservoir, and optimal well placement. Embodiments herein are applicable to high angle and horizontal wells to consider formation layering approximately parallel to the well.

Figure 1:
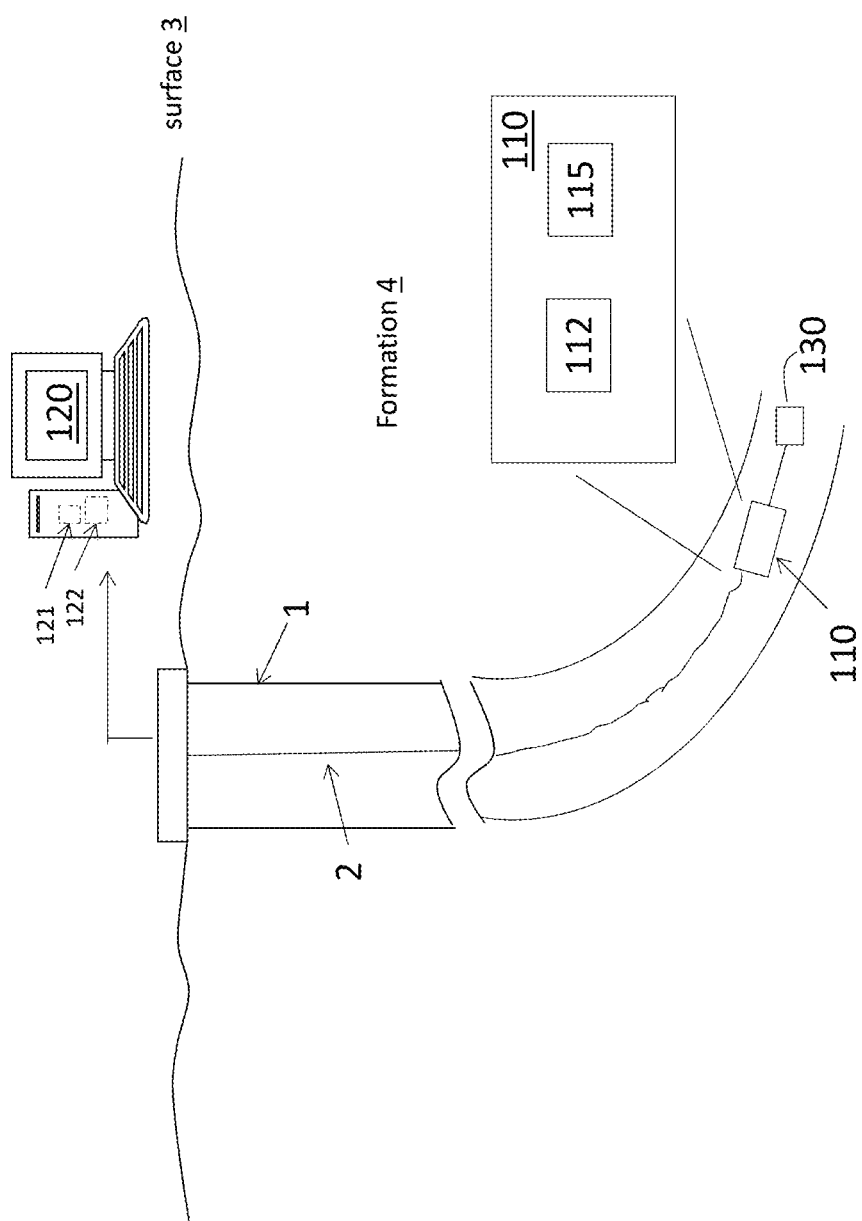
FIG. 1 is a cross-sectional block diagram of a downhole system including a tool whose range of sensitivity is determined according to embodiments.

FIG. 1 is a cross-sectional block diagram of a downhole system including a tool 110 whose range of sensitivity is determined according to embodiments. A subsurface borehole 1 penetrates a formation 4 of one or more types. According to embodiments of the invention, the tool 110 is a known induction tool or other EM tool with components that include two or more coils representing at least one receiver 112 and at least one transmitter 115. The transmitter 115 excites an electromagnetic field at at least one frequency, and the receiver 112 measures the resulting response from the formation 4. The tool 110 may obtain an electromagnetic response for a number of arrays of different frequencies, and coil (transmitter 115/receiver 112) spacings. A resistivity model is obtained from values determined from the electromagnetic response through a known inversion process. This resistivity model is used then, according to known algorithms, to obtain different types of measurements that are referred to generally as synthetic tool response. Based on the number of transmitters 115 and receivers 112, the tool response may vary. The different types of measurements include, for example, complex voltage or amplitude/phase in receiver 112, attenuation or phase shift between two receivers 112 (when there are at least two receivers 112), and compensated or anti-compensated transformations (using two transmitters 115, when there are at least two transmitters 115). Measurements recorded by the tool 110 may be telemetered or otherwise transmitted or transferred to a processing system 120, and apparent resistivity values and/or azimuthal signals may be obtained from the measurements. The processing system 120 includes known components such as one or more processors 121 and one or more memory devices 122 storing instructions for processing. As further detailed below, the processing system 120 performs inversion on the data determined through the tool measurements or in other ways, according to alternate embodiments, and subsequently determines the tool sensitivity range according to the embodiments detailed below. The processing system 120, alone or in combination with other processors and controllers, controls operation of a drill 130 in accordance with the determined tool 110 sensitivity. That is, the resistivity model or a subsequent resistivity model developed with tool 110 measurements may not be used or may be weighted differently at ranges beyond the determined tool 110 sensitivity range. The sensitivity range determined (for a given configuration) for the tool 110 provides a confidence level for different parts of the resistivity model such that ranges of the model beyond the sensitivity range of the tool 110 are associated with the lowest confidence level.

Figure 2:
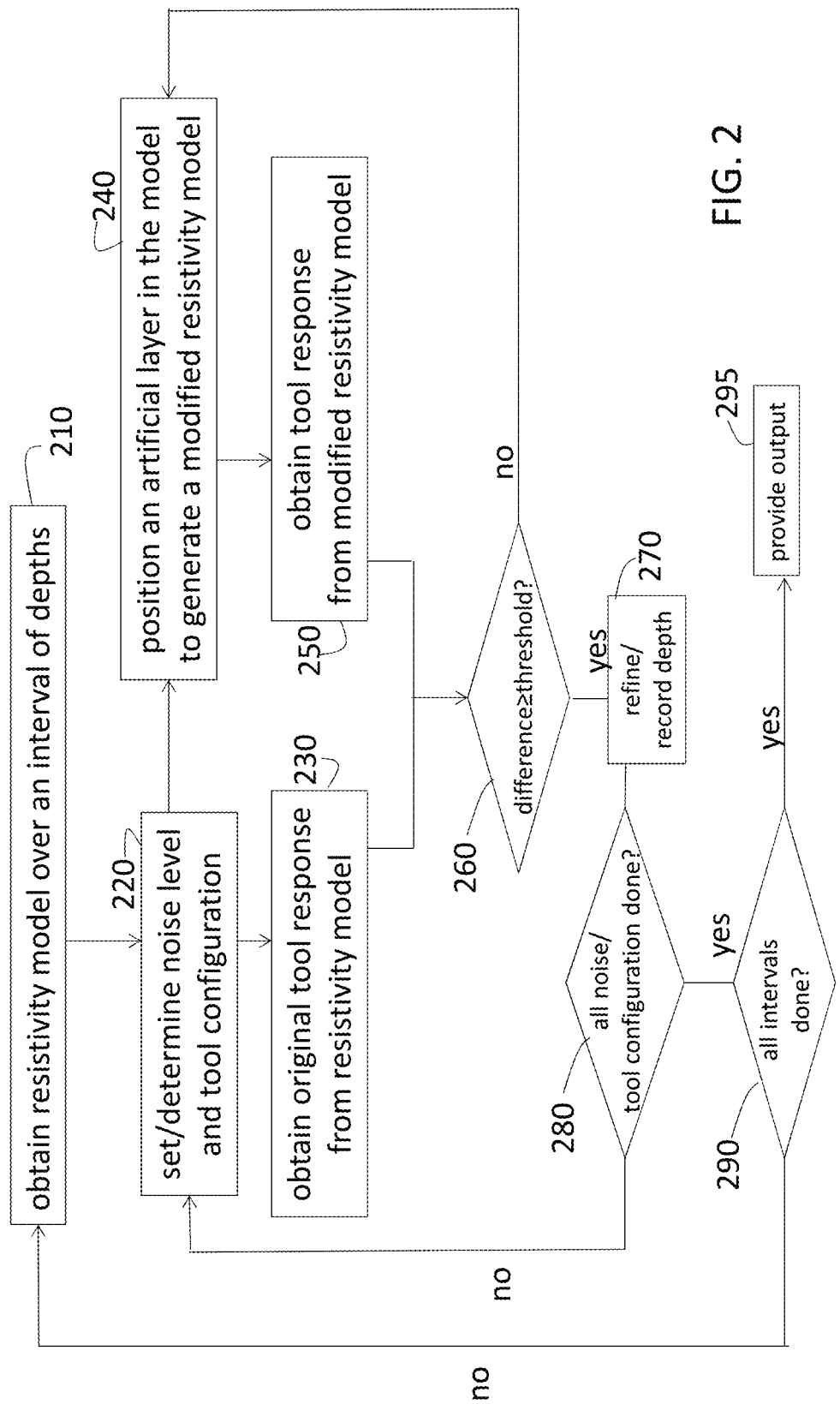
FIG. 2 is a process flow of a method of performing estimation of the tool sensitivity range according to embodiments.

FIG. 2 is a process flow of a method of performing estimation of the tool 110 sensitivity range according to embodiments. At block 210, obtaining a resistivity model over an interval of depths may be done according to more than one embodiment, as detailed with reference to FIG. 3. Setting or determining a noise level and tool configuration, at block 220, is based on whether real or synthetic data is used. When real data is used, the noise level is determined as the real (measured) noise, but when synthetic data is used to determine tool 110 sensitivity, the noise level may be set. Setting the noise level (at block 220) may include using a noise model. The noise model includes two parts: an absolute noise threshold and a relative part given as a percentage of the corresponding measurement value. The standard noise level combines both parts, thus uniformly covering all dynamic range of a particular measurement and possible zero crossings, if any can be present for a measurement type. Similarly, when real data obtained from measurements is used, the tool 110 configuration (e.g., frequency, spacing between the transmitter 115 and receiver 112 coils) is determined as the actual tool 110 configuration used to obtain the measurements. Obtaining original tool response $F^0$ from the resistivity model, at block 230, refers to obtaining the tool response based on known algorithms for the tool configuration set or determined at block 220. Tool response $F^0$ generally refers to a number of variables (e.g., amplitude and phase signals, attenuation, phase shift, azimuthal signal) that may be determined from the resistivity model for the tool configuration. For example, the tool configuration includes at least two receivers 112 when attenuation and phase shift are part of the tool response.

At block 240, positioning an artificial layer 410 (FIG. 4) in the model to generate a modified resistivity model is done according to different scenarios or schemes as detailed with reference to FIG. 4 below. As discussed below, the additional layer 410 with a specified resistivity value is initially added above or below (in depth) the interval selected at block 220. The additional layer 310 is moved closer to the tool 110 at each iteration (based on a check at block 260) based on the scenario. At block 250, the processes include obtaining tool 110 response F from the modified resistivity model. The same algorithm(s) used to generate the original tool 110 response $F^0$ (at block 230) is used to generate the tool 110 response F. As noted above, any number of parameters obtained based on performing known algorithms on the (original or modified) resistivity model may be referred to generally as tool response. The tool response $F^0$, F may be a matrix of values that include, for example, amplitude, phase, attenuation, phase shift, and azimuthal signal. The normalized difference in tool response referenced at block 260 is ΔF, which is the difference (squared and multiplied by weight) between the original tool response $F^0$ (obtained at block 230) and the tool response F obtained (at block 250) with the modified resistivity model. ΔF is computed according to:

$$\Delta F = \sum_{i=1}^{N} w\ (\varepsilon_i)(F_i - F_i^0)^2 \quad [\text{EQ. 1}]$$

The value of ΔF indicates the change in tool 110 response (from the original response obtained without any additional layer 410). In EQ. 1, N is the number of variables that make up the tool 110 response, $\varepsilon_i$ is the noise level associated with each variable of the tool 110 response, and w is the weight given to each variable among the variables that make up the tool 110 response. That is, the change in some variables that make up the tool 110 response may be of more interest than the change in other variables. This could be reflected in a different weight w being assigned to each of the variables that makes up the matrices $F^0$ and F.

At block 260, the processes include checking whether the difference (ΔF) is greater than or equal to a threshold. The threshold is the noise level ε set or determined at block 220. When the difference (ΔF) does not exceed or equal the threshold, then the artificial layer 410 (FIG. 4) is repositioned by a selected or predetermined distance (as further discussed with reference to FIG. 4) and the modified resistivity model is regenerated at block 240. This is done iteratively (blocks 240 through 260), as shown in FIG. 2, until the difference (ΔF) does exceed or equal the threshold. When the value of ΔF is greater than or equal to the noise level ε, then refining or recording the corresponding depth (Z) of the artificial layer 410, at block 270, represents the boundary of the tool 110 sensitivity (for the current noise level and tool configuration (block 220)). Refining refers to determining the depth Z with greater granularity than the selected or predetermined distance by which the artificial layer 410 is repositioned (at block 240). The refining may be according to known methods, such as bisection, which is further discussed with reference to FIG. 4.

The check at block 280 ensures that the processes at blocks 220 through 270 are performed for every noise level and tool 110 configuration of interest. When dealing with actual measured data, only the real noise level and actually used tool 110 configurations may be used in iterations. The check at block 290 ensures that the processes at blocks 220 through 280 are performed for every interval (i.e., every set of depth values or sections of the borehole 1) of interest. When all the configurations for all the intervals are completed, providing output, at block 295, refers to indicating the tool 110 sensitivity ranges along the borehole 1. The tool 110 sensitivity ranges for the various scenarios (at block 220) determined according to the processes shown in FIG. 2 may be illustrated as curves in curtain sections of the resistivity model around the borehole 1 based on the shape of the borehole 1.

Figure 3:
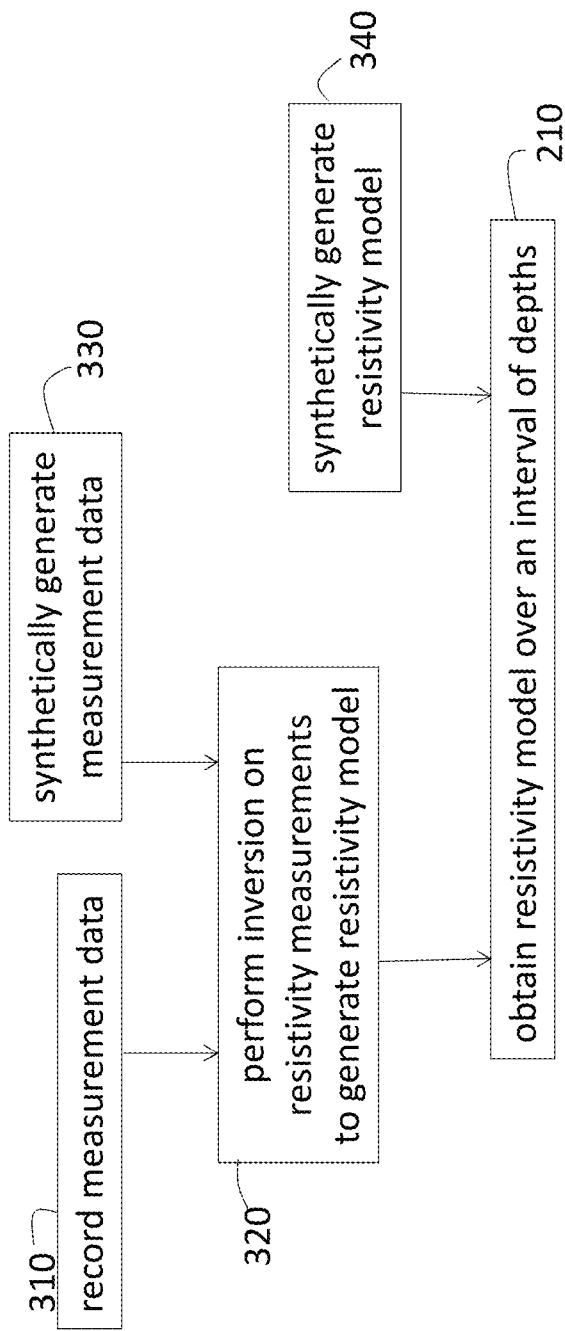
FIG. 3 is a process flow of methods of obtaining a resistivity model over an interval of depths according to different embodiments.

FIG. 3 is a process flow of methods of obtaining a resistivity model over an interval of depths (block 210) according to different embodiments. At block 310, according to one embodiment, recording measurement data may be done by the tool 110 in real time or may have been done previously. The tool 110 provides resistivity measurements that may then be used to determine apparent resistivity values and/or azimuthal signals. At block 320, the processes include performing inversion on the apparent resistivity values and/or azimuthal signals to generate a resistivity model. By selecting an interval of depths from this resistivity model, obtaining a resistivity model over the interval of depths is performed at block 210. When the measurements are recorded (at block 310) in real time, the interval of depths (at block 210) may be processed according to the processes shown in FIG. 2 before or as the tool 110 moves to other depths in the borehole 1. According to the present embodiment, the tool sensitivity determined in real time according to the processes shown in FIG. 2 may be used in geosteering, for example. According to an alternate embodiment, measurements (at block 310) may be pre-recorded, and the interval of depths (at block 210) may be selected from available intervals in the pre-recorded data. According to yet another embodiment, the measurements may not be recorded using a tool 110 at all. Instead, the processes may include synthetically generating measurement data at block 330. Performing inversion (at block 320) on the apparent resistivity values and/or azimuthal signals determined from the synthetically generated measurement data provides the resistivity model from which an interval of depths may be selected (at block 210). Yet another embodiment facilitates skipping the inversion process altogether. According to this embodiment, the processes include synthetically generating the resistivity model at block 340. An interval of depths may be selected (at block 210) from the planned wellpath in the synthetically generated resistivity model. In this case and in the case of synthetically generating measurement data (at block 330), the noise level may be set (at block 220).

Figure 4:
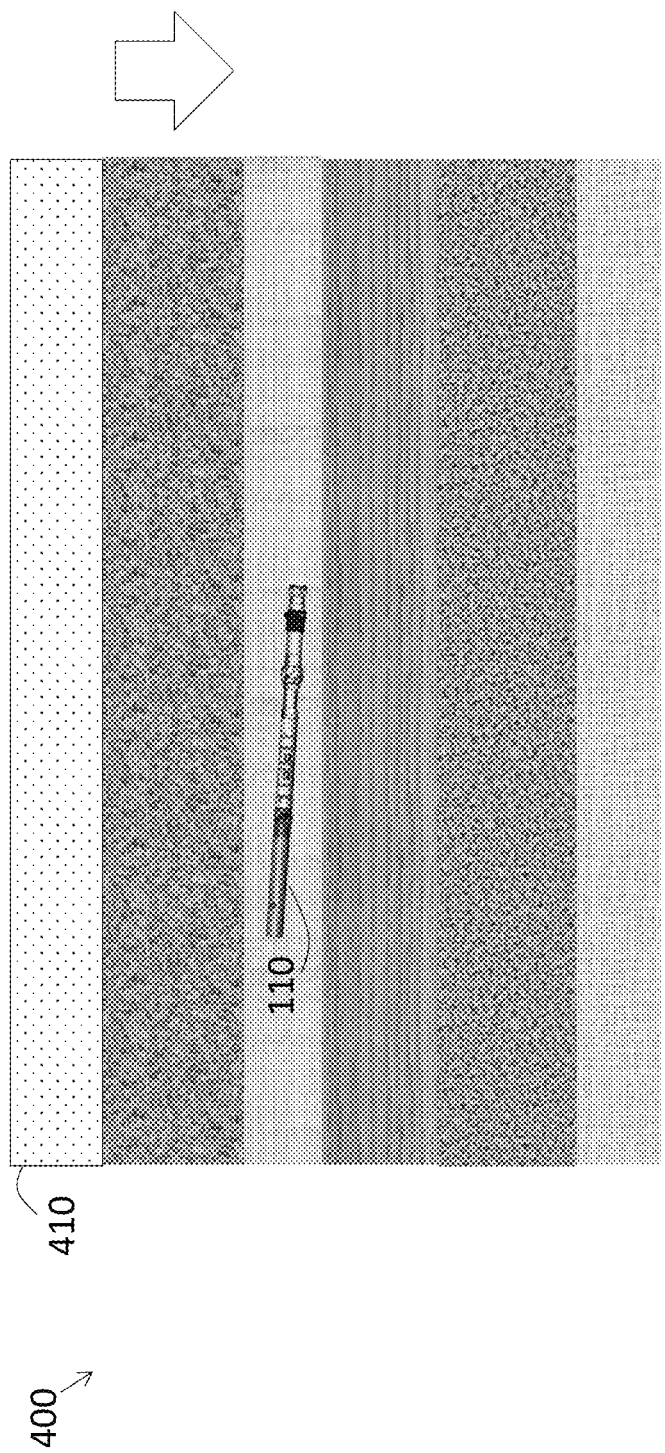
FIG. 4 is a cross-sectional view of an interval of a modified resistivity model with an artificial layer on one side of the tool according to embodiments.

FIG. 4 is a cross-sectional view of an interval of an exemplary modified resistivity model 400 with an artificial layer 410 on one side of the tool 110 according to embodiments. The position of the artificial layer 410 shown in FIG. 4 is an initial position (i.e., the position for the first iteration of process 240). This initial position is beyond the tool 110 sensitivity range and may be defined using the deepest signal and most favorable resistivity contrast, for example, from 2000 ohm to 0.1 ohm. Over the iterations of process 240, the artificial layer 410 is moved closer to the tool 110 until the condition checked at block 260 is passed. Then the tool 110 sensitivity boundary position (depth Z) is found at block 270 with a predefined accuracy. According to one embodiment, the artificial layer 410 is moved iteratively at block 240 at steps (e.g., 1 foot per iteration, 1 centimeter per iteration) that reflect the desired accuracy. These steps may be selected or preset, for example. In alternate embodiments, a coarse estimate of the tool 110 sensitivity boundary may be followed by a more granular refinement as indicated at block 270. This refinement requires performing additional iterations of blocks 240 through 260 even after the check at block 260 indicates that the difference (ΔF) exceeds the threshold. As noted above, one exemplary way of refining the estimate of the tool 110 sensitivity boundary position (or depth Z) is by the bisection method. According to the bisection method, for example, the positioning and re-positioning of the artificial layer 410 (at block 240) may initially be at 2 feet, for example. When the condition at block 260 is met, the artificial layer 410 may then be re-positioned (at block 240) to half of the previous distance. That is, the artificial layer 410 may be moved back (away from the tool 110) by 1 foot. If the condition at block 260 were still passed, the artificial layer 410 may be moved back (away from the tool 110) by 0.5 feet (half the distance). On the other hand, if the condition at block 260 were not passed (when the artificial layer 410 was moved back by 1 foot), then the artificial layer 410 may be moved closer to the tool 110 by 0.5 feet. This process may continue, with the distance of the re-positioning being half of the previous distance each time, until the desired accuracy (e.g., 0.25 feet) is achieved.

Figure 5:
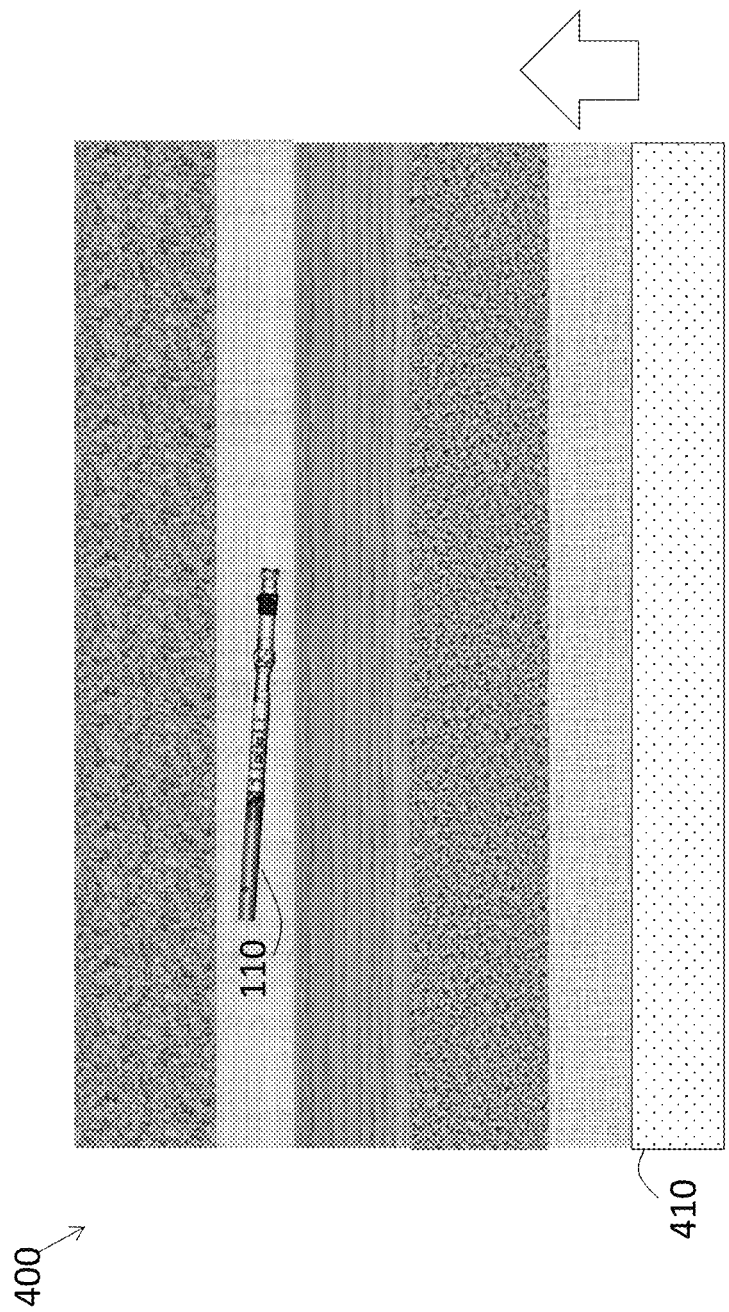
FIG. 5 is a cross-sectional view of an interval of a modified resistivity model with an artificial layer on another side of the tool according to embodiments.

FIG. 5 indicates that the processes shown in FIG. 2 are repeated with the artificial layer 410 at the other side of the tool 110, as well. In this way, the tool 110 sensitivity in both directions may be determined. The distance between the tool 110 and the artificial layer 410 when the condition at block 260 is satisfied (or after the initial artificial layer 410 position that satisfies the condition at block 260 is further refined) is the tool 110 sensitivity boundary (in each direction). The artificial layer 410 is assumed to have a resistivity value based on one of a number of scenarios. This resistivity value is part of the modified resistivity model 400 generated at block 240. According to one scenario, which may be referred to as the asymptotic scenario, the tool configuration is set to one or more of the deepest measurements (usually the lowest frequency and largest spacing between the transmitter 115 and receiver 112 coils), only the absolute part of standard noise (obtained by testing the tool 110) is used, and the resistivity of the additional layer 310 is set to the maximum possible range, Rmin=0.1 ohm-meters and Rmax=2000 ohm-meters, in turn. According to another scenario, which may be referred to as the optimistic scenario, the tool 110 configuration corresponds with two or more of the deepest measurements (an extended set of the deepest measurements from the asymptotic scenario) and standard noise (both absolute and relative parts) is used. Resistivity values of Rmin and Rmax are used for the additional layer 310, in turn, where Rmin values are minimal resistivity values observed in all drilled wells and water zones or observed in all resistivity profiles of the original model and Rmax values are maximal resistivities observed in all drilled wells or observed in all resistivity profiles of the original model. According to yet another scenario, which may be referred to as the realistic scenario, the tool configuration includes all tool 110 measurements, and enlarged standard noise (for pre-well models) or standard noise plus estimated noise from logging-while-drilling resistivity data and inversion misfit is used. Resistivity values of Rmin and Rmax are used for the artificial layer 410, in turn, wherein Rmin and Rmax are the minimal and maximal resistivities observed in the current well or all resistivity profiles of the original model.

While some exemplary scenarios have been detailed herein, the embodiments discussed herein are not limited to any particular scenario, and additional conditions for the artificial layer 410 are contemplated. As noted above, knowing the range of sensitivity of the tool 110 can facilitate decision making with regard to drilling direction, geosteering, and other aspects of the exploration and production efforts. This is because the resistivity model or any subsequent resistivity model obtained with tool 110 measurements with a particular configuration of the tool (e.g., frequency, spacing between the transmitter 115 and receiver 112) may not be used or may be weighted differently beyond the range of sensitivity determined for the configuration of the tool 110 (according to the embodiments detailed above). As such, decisions regarding geosteering and drilling direction, for example, that are made according to the resulting resistivity model are improved.

Embodiment 1

A method of controlling drilling based on determining a sensitivity range of an electromagnetic tool. The method includes obtaining a resistivity model over an interval of depths, obtaining an original tool response from the resistivity model over the interval of depths for a tool configuration, positioning an artificial layer in the resistivity model to generate a modified resistivity model, obtaining a modified tool response from the modified resistivity model, and iteratively performing the positioning the artificial layer and the obtaining the modified tool response. The method also includes estimating the sensitivity range according to a position of the artificial layer when a normalized difference between the original tool response and the modified tool response reaches a threshold value, and assigning a different confidence level to information obtained from the resistivity model beyond the sensitivity range and controlling the drilling based on the resistivity model and the confidence level.

Embodiment 2

The method of any prior embodiment further comprising obtaining measurements from the electromagnetic tool and determining apparent resistivity values and azimuthal signals from the measurements, wherein the obtaining the resistivity model includes performing an inversion on the apparent resistivity values and the azimuthal signals.

Embodiment 3

The method of any prior embodiment wherein the obtaining the measurements is done in real time or in a stored log.

Embodiment 4

The method of any prior embodiment wherein the obtaining the resistivity model is based on synthetic data.

Embodiment 5

The method of any prior embodiment wherein the positioning the artificial layer includes assigning a resistivity value to the artificial layer according to a scenario.

Embodiment 6

The method of any prior embodiment wherein the iteratively performing the positioning the artificial layer includes moving the artificial layer closer to a position of the electromagnetic tool in the modified resistivity model.

Embodiment 7

The method of any prior embodiment wherein the estimating the sensitivity range is based on a noise level and a configuration of the electromagnetic tool.

Embodiment 8

The method of any prior embodiment wherein the configuration includes a frequency and a spacing between a transmitter and a receiver of the electromagnetic tool.

Embodiment 9

A system to control drilling by determining a sensitivity range of an electromagnetic tool. The system includes a memory device configured to store a resistivity value of an artificial layer corresponding with scenarios. The system also includes a processor configured to obtain a resistivity model over an interval of depths, obtain an original tool response from the resistivity model over the interval of depths for a tool configuration, position an artificial layer in the resistivity model to generate a modified resistivity model, obtain a modified tool response from the modified resistivity model, iteratively perform positioning of the artificial layer and obtaining the modified tool response, estimate the sensitivity range according to a position of the artificial layer when a normalized difference between the original tool response and the modified tool response reaches a threshold value, assign a different confidence level to information obtained from the resistivity model beyond the sensitivity range, and control the drilling based on the resistivity model and the confidence level.

Embodiment 10

The system of any prior embodiment wherein the electromagnetic tool obtains measurements in real time and the processor determines apparent resistivity values and azimuthal signals from the measurements, and the processor obtains the resistivity model by performing an inversion on the apparent resistivity values and the azimuthal signals.

Embodiment 11

The system of any prior embodiment wherein the processor obtains previously stored apparent resistivity values and azimuthal signals from logs and obtains the resistivity model by performing an inversion on the stored apparent resistivity values and azimuthal signals.

Embodiment 12

The system of any prior embodiment wherein the resistivity model is a synthetically generated resistivity model.

Embodiment 13

The system of any prior embodiment wherein the processor assigns the resistivity value of the artificial layer according to one of the scenarios.

Embodiment 14

The system of any prior embodiment wherein the processor estimates the sensitivity range based on a noise level and a configuration of the electromagnetic tool, and the configuration includes a frequency and a spacing between a transmitter and a receiver of the electromagnetic tool.

Embodiment 15

The system of any prior embodiment wherein the processor estimates the sensitivity range for a number of different intervals of depths.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of controlling drilling based on determining a sensitivity range of an electromagnetic tool, the method comprising:
    obtaining a resistivity model over an interval of depths;
    obtaining an original tool response from the resistivity model over the interval of depths for a tool configuration;
    positioning an artificial layer in the resistivity model to generate a modified resistivity model;
    obtaining a modified tool response from the modified resistivity model;
    iteratively performing the positioning the artificial layer and the obtaining the modified tool response;
    estimating the sensitivity range according to a position of the artificial layer when a normalized difference between the original tool response and the modified tool response reaches a threshold value; and
    assigning a different confidence level to information obtained from the resistivity model beyond the sensitivity range and controlling the drilling based on the resistivity model and the confidence level.

2. The method according to claim 1, further comprising obtaining measurements from the electromagnetic tool and determining apparent resistivity values and azimuthal signals from the measurements, wherein the obtaining the resistivity model includes performing an inversion on the apparent resistivity values and the azimuthal signals.

3. The method according to claim 2, wherein the obtaining the measurements is done in real time or in a stored log.

4. The method according to claim 1, wherein the obtaining the resistivity model is based on synthetic data.

5. The method according to claim 1, wherein the positioning the artificial layer includes assigning a resistivity value to the artificial layer according to a scenario.

6. The method according to claim 1, wherein the iteratively performing the positioning the artificial layer includes moving the artificial layer closer to a position of the electromagnetic tool in the modified resistivity model.

7. The method according to claim 1, wherein the estimating the sensitivity range is based on a noise level and a configuration of the electromagnetic tool.

8. The method according to claim 7, wherein the configuration includes a frequency and a spacing between a transmitter and a receiver of the electromagnetic tool.

9. A system to control drilling by determining a sensitivity range of an electromagnetic tool, the system comprising:
    a memory device configured to store a resistivity value of an artificial layer corresponding with scenarios; and
    a processor configured to obtain a resistivity model over an interval of depths, obtain an original tool response from the resistivity model over the interval of depths for a tool configuration, position an artificial layer in the resistivity model to generate a modified resistivity model, obtain a modified tool response from the modified resistivity model, iteratively perform positioning of the artificial layer and obtaining the modified tool response, estimate the sensitivity range according to a position of the artificial layer when a normalized difference between the original tool response and the modified tool response reaches a threshold value, assign a different confidence level to information obtained from the resistivity model beyond the sensitivity range, and control the drilling based on the resistivity model and the confidence level.

10. The system according to claim 9, wherein the electromagnetic tool obtains measurements in real time and the processor determines apparent resistivity values and azimuthal signals from the measurements, and the processor obtains the resistivity model by performing an inversion on the apparent resistivity values and the azimuthal signals.

11. The system according to claim 9, wherein the processor obtains previously stored apparent resistivity values and azimuthal signals from logs and obtains the resistivity model by performing an inversion on the stored apparent resistivity values and azimuthal signals.

12. The system according to claim 9, wherein the resistivity model is a synthetically generated resistivity model.

13. The system according to claim 9, wherein the processor assigns the resistivity value of the artificial layer according to one of the scenarios.

14. The system according to claim 9, wherein the processor estimates the sensitivity range based on a noise level and a configuration of the electromagnetic tool, and the configuration includes a frequency and a spacing between a transmitter and a receiver of the electromagnetic tool.

15. The system according to claim 9, wherein the processor estimates the sensitivity range for a number of different intervals of depths.

* * * * *